US012647724B2

(12) United States Patent
Van Neer et al.

(10) Patent No.: US 12,647,724 B2
(45) Date of Patent: Jun. 2, 2026

(54) SOUND DETECTION DEVICE

(71) Applicant: Nederlandse Organisatie voor toegepast-natuurwetenschappelijk onderzoek TNO, 's-Gravenhage (NL)

(72) Inventors: Paul Louis Maria Joseph Van Neer, Bergschenhoek (NL); Peter Johan Harmsma, Vleuten (NL); Daniele Piras, Amsterdam (NL); Robert Karl Altmann, Abcoude (NL); Maurits Sebastiaan Van Der Heiden, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 72 days.

(21) Appl. No.: 17/793,190

(22) PCT Filed: Jan. 18, 2021

(86) PCT No.: PCT/NL2021/050026

§ 371 (c)(1),
(2) Date: Jul. 15, 2022

(87) PCT Pub. No.: WO2021/145769

PCT Pub. Date: Jul. 22, 2021

(65) Prior Publication Data

US 2023/0054431 A1 Feb. 23, 2023

(30) Foreign Application Priority Data

Jan. 16, 2020 (EP) .................................... 20152261

(51) Int. Cl.
*H04R 3/00* (2006.01)
*H04R 1/34* (2006.01)
(Continued)

(52) U.S. Cl.
CPC ............. *H04R 3/005* (2013.01); *H04R 1/342* (2013.01); *H04R 1/406* (2013.01); *H04R 17/02* (2013.01);
(Continued)

(58) Field of Classification Search
CPC ........ H04R 3/005; H04R 1/342; H04R 1/406; H04R 23/008; H04R 2201/401;
(Continued)

(56) References Cited

U.S. PATENT DOCUMENTS 4,245,333 A * 1/1981 Jelks .................... G10K 11/346 367/121
5,896,636 A * 4/1999 Penunuri .................. H03H 3/08 29/25.35
(Continued)

FOREIGN PATENT DOCUMENTS

EP 0309003 A2 * 3/1989
EP 2988527 A1 2/2016
(Continued)

OTHER PUBLICATIONS

XP032308628 (Andreas Kunadt et al IEEE Sensors (2012) 1-4).
International Search Report and Written Opinion—PCT/NL2021/050026—mailing date Jul. 22, 2021.

*Primary Examiner* — Carolyn R Edwards
*Assistant Examiner* — Kuassi A Ganmavo
(74) *Attorney, Agent, or Firm* — Banner & Witcoff, Ltd.

(57) ABSTRACT

The sound detection device comprises a substrate, an array of sound detectors in or on a surface of the substrate, a processing circuit coupled to the sound detectors, the processing circuit being configured to sum signals from the sound detectors with relative time delays or phase shifts that compensate for propagation delay of sound along the array in a sound propagation mode that is bound to said surface. In an embodiment the sound in said sound propagation mode
(Continued)

is bound to the surface using an acoustic waveguide, wherein the surface of the substrate forms a part of the acoustic waveguide, the sound detection device comprising a wall facing the array of sound detectors, with a space between the surface of the substrate and the wall, the sound detection device comprising an opening that provides incoming sound from outside the device access to said space, for excitation of the wave in the bound propagation mode in the acoustic waveguide by sound from outside the device.

12 Claims, 8 Drawing Sheets

(51) Int. Cl.
*H04R 1/40* (2006.01)
*H04R 17/02* (2006.01)
*H04R 23/00* (2006.01)

(52) U.S. Cl.
CPC ...... *H04R 23/008* (2013.01); *H04R 2201/401* (2013.01); *H04R 2201/403* (2013.01); *H04R 2410/01* (2013.01); *H04R 2410/03* (2013.01)

(58) Field of Classification Search
CPC .... H04R 2410/01; H04R 1/326; H04R 17/02; H04R 2201/003; H04R 2201/403; H04R 2410/03; H03H 9/6403
See application file for complete search history.

(56) References Cited

U.S. PATENT DOCUMENTS

| | | | | |
|---|---|---|---|---|
| 6,091,406 | A * | 7/2000 | Kambara | G06F 3/0436 345/177 |
| 6,249,586 | B1 * | 6/2001 | Stoffel | H04R 19/04 381/174 |
| 8,089,196 | B1 * | 1/2012 | Cular | G01N 29/022 310/313 R |
| 2006/0175928 | A1 * | 8/2006 | Kando | H03H 9/0222 310/311 |
| 2007/0297739 | A1 * | 12/2007 | Schneider | G10K 11/24 385/129 |
| 2008/0205668 | A1 * | 8/2008 | Torii | H04R 19/005 381/113 |
| 2009/0279714 | A1 * | 11/2009 | Kim | H04R 3/005 901/1 |
| 2013/0101141 | A1 * | 4/2013 | McElveen | H04S 3/002 381/123 |
| 2013/0106243 | A1 * | 5/2013 | Reinhardt | H03H 9/17 310/313 R |
| 2014/0093114 | A1 * | 4/2014 | Nguyen | H04R 1/08 381/361 |
| 2014/0203893 | A1 * | 7/2014 | Kando | H03H 9/02574 333/187 |
| 2014/0225684 | A1 * | 8/2014 | Kando | H03H 9/14594 333/195 |
| 2015/0086037 | A1 * | 3/2015 | Hu | H04R 1/406 381/92 |
| 2015/0281833 | A1 * | 10/2015 | Shigenaga | H04R 3/005 381/92 |
| 2017/0093371 | A1 * | 3/2017 | Takamine | H03H 9/02574 |
| 2020/0166393 | A1 * | 5/2020 | Benkert | G01N 29/222 |
| 2020/0353463 | A1 * | 11/2020 | Rivas | B01L 3/50273 |
| 2021/0003534 | A1 * | 1/2021 | Lal | G01N 29/07 |
| 2021/0057635 | A1 * | 2/2021 | Allibert | H10N 30/097 |

FOREIGN PATENT DOCUMENTS

| | | | |
|---|---|---|---|
| JP | H10048039 | A | 2/1998 |
| WO | 2005074317 | A1 | 8/2005 |
| WO | 2016073936 | A2 | 5/2016 |

* cited by examiner

SOUND DETECTION DEVICE

CROSS-REFERENCE TO RELATED APPLICATIONS

This application is a U.S. National Stage application under 35 U.S.C. § 371 of International Application PCT/NL2021/050026 (published as WO 2021/145769 A1), filed Jan. 18, 2021 which claims the benefit of priority to Application EP 20152261.2, filed Jan. 16, 2020. Benefit of the filing date of these prior applications is hereby claimed. Each of these prior applications is hereby incorporated by reference in its entirety.

FIELD OF THE INVENTION

The invention relates to a sound detection device.

BACKGROUND

It is known to an array of sound detectors to increase the directivity of sound detection (as used herein "sound" includes ultrasound). In a phased array the signals from an array of sound detectors with relative time or phase delays that make the signals at the sound detectors coherent for sound from a selected direction. In a phased array the relative time or phase delays are selected according to the angle between the plane of the surface in which the sound detectors are located and the plane of a free space wave front of the sound from the selected direction, that is, of a wave that is not bound to the surface. The possibility of such a wave direction dependent selection of relative time or phase delays increases the sensitivity to sound from the selected direction relative to the sensitivity to sound from the other directions. The use of a plurality of sound detectors also improves the signal to noise ratio. The size of this improvement depends on the number of array elements. For sound from the selected direction, the signal to noise ratio of the sum will be higher than that of the signal from individual detectors.

However, phased arrays are neither intended nor suitable for increasing the signal to noise ratio of omnidirectional sound reception. Although a phased array obtain improved signal to noise ratios for reception signals in specific directions, the signal to noise ratio of an omnidirectional sum of such reception signals over all directions is not necessarily increased.

An ultrasonic flow meter is disclosed in an article by Kunath et al, titled "Ultrasonic flow meter with piezoelectric transducer arrays integrated in the walls of a fiber-reinforced composite duct", published in 2013 IEEE sensors pages 1-4, EPO ref XP032308628. Kunath et al. make use of the difference between the propagation speeds of acoustic plane waves that travel with a component of their propagation direction along and opposite to the fluid flow respectively. Plane waves are used that travel between opposite walls of the duct at an oblique angle to the walls. Kunath et al. note that reproducible excitation of plate waves in the sound receiving duct wall is only possible if the sound waves are plane waves and the oblique angle between the duct wall does not change over the length of the excitation zone (i.e. when curved wave fronts are avoided).

In order to ensure plane waves, Kunath et al. uses arrays of transducers on the opposite walls of the duct each as a phased array to excite and receive selected plane waves through the duct at the oblique an angle to the walls. The phase delays used in the phased arrays compensate for delays according to the angle between the walls of the duct and the plane wave propagation direction in the duct. The fluid flow velocity can be determined from the difference between upstream and downstream propagation delay of the plane waves between the arrays.

US2005074317 discloses a linear microphone array that provides frequency independent directivity. Microphones for the highest frequencies at one end of the array and microphones for the lowest frequencies at the other end.

EP2988527 discloses use of three orthogonal linear microphone arrays to detect the location of sound sources.

WO2016073936 discloses an array of ultrasonic transducers for use as a phased array. A chip package with ultrasound waveguides between the transducers and acoustic ports.

JPH1048039 discloses an ultrasonic wave receiver with a plurality of sensors on an optical waveguiding channel. Light is transmitted along the channel. The sensors create variation of the refractive index of the channel when they receive an ultrasonic wave. Light received from the channel is used to detect the effect of ultrasound

SUMMARY

Among others, it is an object to provide for a sound detection device wherein an array of sound detectors is used to improve the signal to noise ratio without creating a strongly direction dependent sensitivity.

A sound detection device is provided, the sound detection device comprising

- a substrate;
- an array of sound detectors in or on a surface of the substrate;
- a processing circuit coupled to the sound detectors, the processing circuit being configured to sum signals from the sound detectors with relative time delays or phase shifts that compensate for propagation delay of sound along the array in a sound propagation mode that is bound to said surface. Thus, the size of the delays or phase shifts are defined according to the propagation speed of the sound propagation mode that arises in the detection device. Herein the detection device is configured to detect sound in a sound propagation mode that is bound to the surface of the substrate on or in which the sound detectors are located. A sum of the signals from the sound detectors is formed with relative delays or phase shifts selected to compensate for the delay due propagation of the bound mode along the array, rather than according to a direction of incoming sound in free space.

A sound propagation mode that is bound to said surface can be a propagation mode of an acoustic waveguide, wherein the surface forms one of the walls of the waveguide, or a wave propagation mode of an acoustic boundary wave. The waveguide may be a waveguide a waveguide that contains a space for fluid outside the substrate or a waveguide that contains the substrate (herein referred to as bulk propagation mode of the substrate). A boundary wave (also referred to as surface wave) is a wave that depends on the surface of the substrate in order to propagate, substantially without being affected by the thickness of the substrate or space for fluid in the direction perpendicular to that surface.

Preferably, the device contains one or more structures that define an acoustic waveguide that contains a space for fluid outside the substrate for the bound sound propagation mode. This improves the signal to noise ratio by concentrating the sound and reducing sound leakage.

In an embodiment the waveguide comprises a wall that faces the surface of the substrate, with a space in between for sound propagation. An opening at the start of the acoustic waveguide between the substrate and the wall is used to enable excitation of sound in the acoustic waveguide by incoming external sound. Such a wall also prevents external sound from reaching the sound detectors in the acoustic waveguide directly.

A plurality of arrays may be provided along the acoustic waveguide, on different sides of the space between the wall and the substrate, and a sum of signals from all these detectors may be formed, with relative delays or phase shifts to compensate for the delay due propagation through the acoustic waveguide. This increases the signal to noise ratio.

In an embodiment wherein the propagation mode that is bound to said surface is a bulk propagation mode of the substrate or a surface propagation mode of the substrate, the sound detection device comprises an acoustic impedance matching layer on a part of substrate, ahead of array of sound detectors as seen along the direction of propagation of the sound propagation mode, configured to increase sound energy transfer into the sound propagation mode or surface propagation mode of the substrate from sound in a surrounding of the substrate. Thus more sound energy will be transferred than in the absence of the acoustic impedance matching layer on the part of substrate ahead of array of sound detectors. This improves the signal to noise ratio obtained when delays or phase shifts that compensate for propagation delay of sound along the array in the bulk propagation mode or surface propagation mode of the substrate are used.

BRIEF DESCRIPTION OF THE DRAWING

These and other objects and advantageous aspects will become apparent from a description of exemplary embodiments with reference to the following figures.

DETAILED DESCRIPTION OF EXEMPLARY EMBODIMENTS

Figure 1:
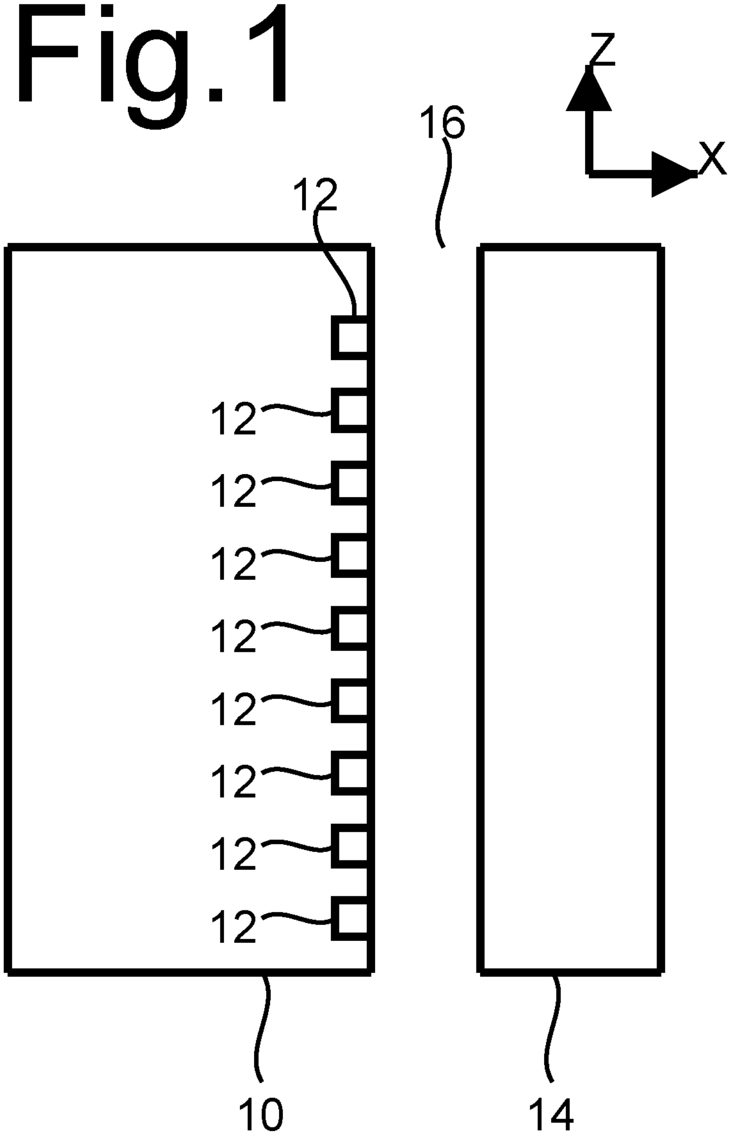
FIG. 1 shows the geometry of a sound detection device

FIG. 1 shows the geometry of a sound detection device comprising a substrate 10, an array of sound detectors 12 in or on a surface of substrate 10, a wall 14 spaced from and in parallel with the surface of substrate 10. For reference, coordinate axes are shown, including an x-axis perpendicular to the surface of substrate 10 and a z-axis along the surface. The space between substrate 10 and wall 14 extends along the substrate in the direction of the z-axis. At the edge of substrate 10 and wall 14 the space is open to form an opening 16 that allows incoming sound waves from outside the device to excite a sound wave propagating between substrate 10 and wall 14 in the negative z-direction.

Substrate 10 and wall 14 form walls of an acoustic waveguide which provides for propagation of such an excited wave that enters the waveguide from outside the waveguide. A propagation mode of such an acoustic waveguide, wherein the surface of substrate 10 forms a wall of the waveguide, forms sound propagation mode that is bound to the surface of the substrate by the waveguide. In an embodiment, this acoustic waveguide may have further walls (not shown) extending between substrate 10 and wall 14, perpendicularly to substrate 10 and wall 14, at different positions along the direction perpendicular to the x and z direction (which will be referred to as the y-direction. But on or both of such further walls may be left out.

As shown, sound detectors 12 are located at successively increasing distances from opening 16. Sound detectors 12 may be located at successive positions along a straight line along the direction of the z-axis. But other arrangements with increasing distance to opening 16 may be used. A single one dimensional array may suffice. In an embodiment, a plurality of linear arrays may be present in parallel on or in substrate 10 at different positions along the y-direction. Preferably, sound detectors 12 are equidistantly spaced in the array, but this is not necessary. Although substrate 10 and wall 14 are show to have right angles at opening 16, it should be realized that other configurations may be used, such as an opening that flares out obliquely from the part of substrate 10 and/or wall 14 at the distances at which sound detectors 12 are located. This may be used to increase the captured sound energy.

In operation the sound detection device is embedded in a medium, such as water or another liquid, or a solid and exposed to incoming sound from outside sound detection device with a propagation direction that at least has a component in the z-direction. An incoming sound signal at opening 16 will excite a propagating signal that propagates as a guided by the acoustic waveguide formed by the surface of substrate 10 and wall 14.

Sound detectors 12 sense an effect of pressure variations due to the propagating signal as it travels through the acoustic waveguide formed between the surfaces of substrate 10 and wall 14. For example, if the incoming signal is a pulse signal, the propagating signal is a pulse signal that travels through the waveguide. Different sound detectors 12 sense the pressure variations with different propagation delay (or phase) corresponding to the different positions of sound detectors 12 along the direction of propagation and the velocity of the excited signal in the acoustic waveguide.

Figure 2:
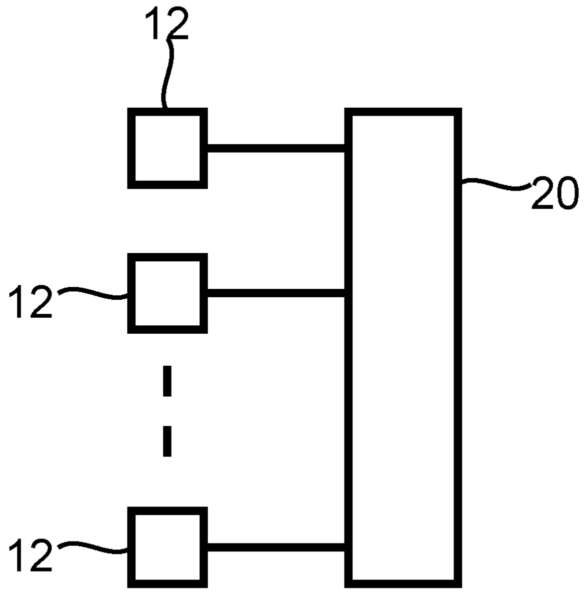
FIG. 2 shows an electronic circuit of the sound detection device

FIG. 2 shows an electronic circuit of the sound detection device. Sound detectors 12 are coupled to a processing circuit 20. Processing circuit 20 is configured to form a sum signal from sound detectors 12 with different relative delays or phase shifts. The delays or phase shifts are selected to compensate for the differences between the propagation delays to sound detectors 12. From the sum signal processing circuit 20 may estimate the amplitude of the incoming signal at opening 16 and/or a time point of its arrival or its phase.

In its simplest form, when a single frequency or narrow frequency band signal is used, or the velocity is independent of frequency and the noise spectrum is frequency independent, processing circuit 20 may be configured to form a sum s(t−dt(i), i) of signals s(t,i) where "i" indexes the different sound detectors and t represents time, from sound detectors 12 with different relative delays dt(i) or phase shifts selected to compensate for the differences between the propagation delays to sound detectors 12. The forming may be implemented by first applying selected delays to the signals from the individual sound detectors and then summing the delayed signals. Alternatively the forming may be done in the Fourier transform domain, by applying phase factors followed by summing. In other embodiments forming the sum may comprise after applying some delays and partial summing followed by applying delays to sums of groups of signals.

The delays or phase shifts may be determined based on a known propagation speed "c" of the excited wave in the waveguide and the distances z(i) of the different sound detectors 12 from opening 16, for example by using time delays dt(i) relative to the last sound detector in the array (i=n) according to dt(i)=(z(i)−z(n))/c. In an embodiment, the delay may be determined by means of calibration for example by measuring delays with which a reference pulse is received at different sound detectors, or by determining dt(i) values that result in the highest correlation between signals from the different sound detectors 12. This can improve the signal to nose ratio when the propagation speed varies with distance, e.g. due to the presence of the detectors.

The illustrated embodiment differs from a phased array by the presence of a wall 14 broadside from substrate 10 that blocks sound arriving in a straight line from a target. But it may be noted that even apart from this, the use of relative delays or phase shifts differs from the use of relative delays or phase shifts as used in a phased array. In a phased array, relative delays or phase shifts are used to compensate for direct different travel times from a target to the different array elements, whereas in the present device relative delays or phase shifts are used to compensate for different travel times along the surface of substrate 10, from one sound detector 12 to another, no matter where the target is located.

Due to waveguide effects of the waveguide formed between substrate 10 and wall 14, the relevant signal velocity may be different for different frequency components of the signal. When the velocity is frequency dependent and the signal contains frequency components at more than a single frequency, compensations may be applied using frequency dependent phase factors or delays for the different frequency components. If the incoming signal is a pulse that contains a range of frequency components, using frequency dependent phase factors or delays reduces the effect of dispersion on the pulses detected by the different sound detectors.

The sum may be a weighted sum wherein different frequency components are weighted differently. For example, if the noise is frequency dependent, the different frequency components of the signal may be given different weight in the sum, to increase the signal to noise ratio (as is known per se for a commonly used noise model a weight factor (S(f)/(S(f)+N(f)) can be used to optimize the signal to noise ratio, where S(f) is the spectral density of the signal at frequency f and N(f) is the spectral density of the noise).

The distance between substrate 10 and wall 14 and hence the size of opening 16 is preferably less than a wavelength of the incoming sound, e.g. less than half that wavelength or between a quarter and three quarters of the shortest acoustic wavelength in the range of acoustic wavelengths for which the measurements are performed. Because the distance at opening 16 is so small the sensitivity of excitation of the wave between substrate 10 and wall 14 to the propagation direction of the incoming wave is small.

When a larger distance is used between substrate 10 and wall 14, i.e. a larger opening 16, this causes the direction sensitivity to increase with increasing distance between substrate 10 and wall 14. But the direction sensitivity is not or hardly dependent on the size of the detector array, in contrast with phased arrays, where the direction sensitivity would increase with increasing array size. The direction sensitivity due to use of distance larger than a wavelength or half a wavelength between substrate 10 and wall 14, may or may not be acceptable, dependent on the type and location of a target that must be detected.

Processing circuit 20 may be configured to sample the signals from sound detectors 12 at a predetermined sample rate, e.g. 1 MHz. Processing circuit 20 may be configured to apply frequency passband filtering to the sum and/or the signals from individual sound detectors. The band filtering may be used to select a range of acoustic wavelengths for which the measurements are performed.

The use of the sum has the effect that the signal to noise ratio due to noise from sound detectors 12 is increased compared to the signal to noise ratio of the signal from an individual sound detector 12. The signals add up coherently, but the noise only adds up incoherently. The use of sound detectors 12 that are exposed to the excited wave in the acoustic waveguide, rather than directly to the incoming sound from outside the device, ensures that any number of sound detector 12 can be used to increase the signal to noise ratio without increasing the direction sensitivity of the sound detection.

In the sum equal weight may be given to the signals from all sound detectors 12. Alternatively, the signals from different sound detectors 12 may be given different weight. For example, if the signal strength of the excited wave decreases with distance from opening 16, signals from different sound detectors 12 may be given less weight with increasing distance from opening 16. This can be used to improve the signal to noise ratio. When the noise at all sound detectors is equal and the relative signal amplitudes at different sound detectors 12 labeled "i" are A(i), an optimal estimate of the incoming signal may be obtained when the weights w(i) given to the signals from different sound detectors 12 "i" differ in proportional to the A(i) of these sound detectors 12.

Figure 3:
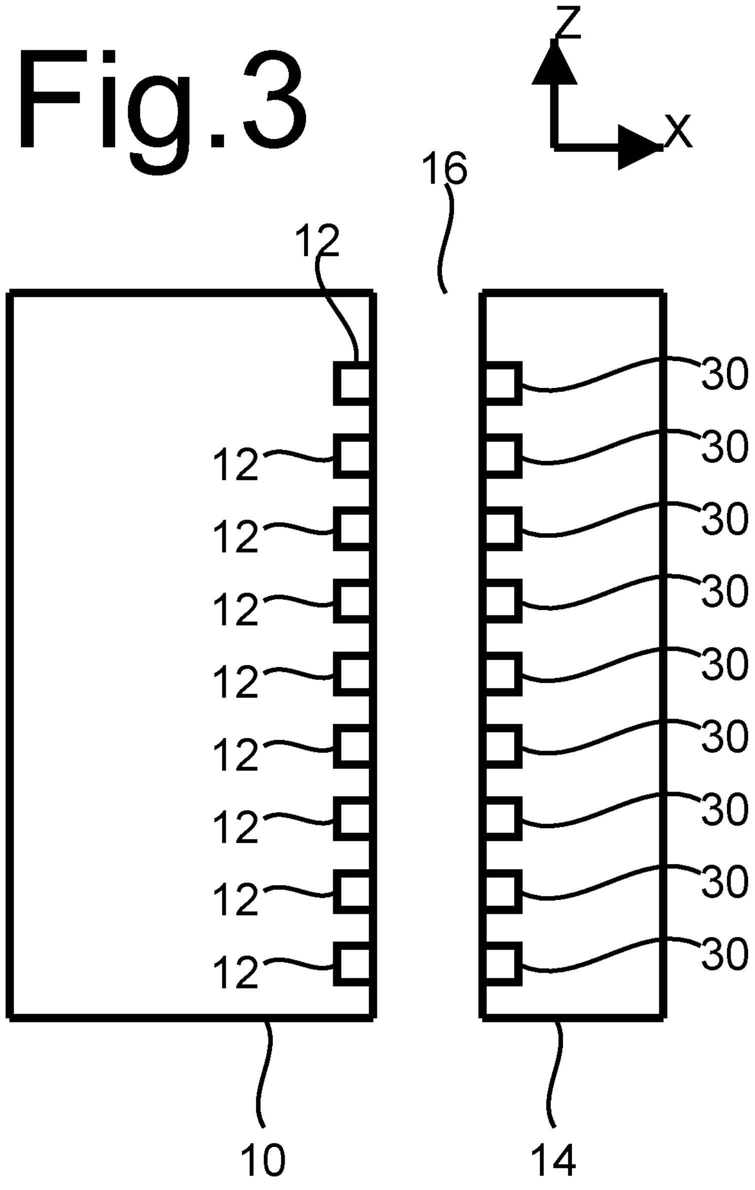
FIG. 3 shows an embodiment of the sound detection device with arrays on opposite sides
Figure 4:
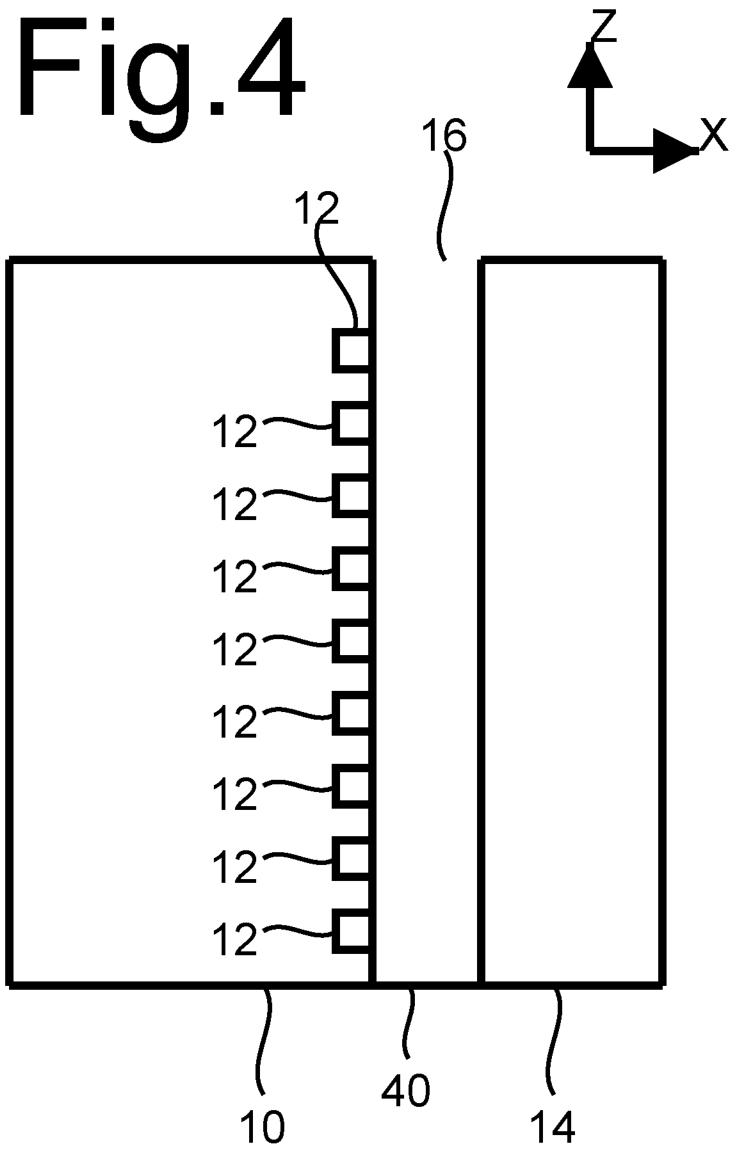
FIG. 4 shows an embodiment of the sound detection device with a closure

FIG. 3 shows an embodiment wherein wall 14 forms a further substrate, with an array of further sound detectors 30 in or on the further substrate for detecting sound in the acoustic waveguides. In this embodiment, processing circuit 20 is configured to receive detected signals from both the array of sound detectors 12 and to form a sum of signals from sound detectors 12 and further sound detectors 30 with different relative delays selected to compensate for the differences between the propagation delays to sound detectors 12 and further sound detectors 30. In all of the embodiments with wall 14 at least one an array of further sound detectors 30 may be present in or on wall 14 for detecting sound in the acoustic waveguides FIG. 4 shows an embodiment wherein the acoustic waveguide space between the surface of substrate 10 and wall 14 is closed off by a further wall 40 at a side of the space opposite opening 16. This may be used to prevent excitation of waves in the space between the surface of substrate 10 and wall 14 from the side of the space opposite opening 16. In an embodiment further wall 40 may be a sound reflecting wall that reflects the guided acoustic wave. Thus, the detected signal energy can be increased. For example, if a pulse signal is used, processing circuit 20 may be configured to apply spatio-temporal filtering of the detected signal as a function of detector position and time can be used to separate signal components of the pulse and its reflection before applying compensation for the differences between the propagation delays to sound detectors 12 according to the directly arriving signal and the reflected signal. Spatio-temporal filters that separate signals travelling in opposite directions are known per se.

In terms of narrow frequency band signals, or individual frequency components, the reflection cause a standing wave pattern. To optimize the impact of standing wave effects on the resulting signal due to the reflection in the case where a narrow frequency band signal of predetermined frequency is used, sound detectors 12 may be located at positions where the detected amplitudes are maximally increased by the standing wave effect, or at least not diminished.

Figure 5:
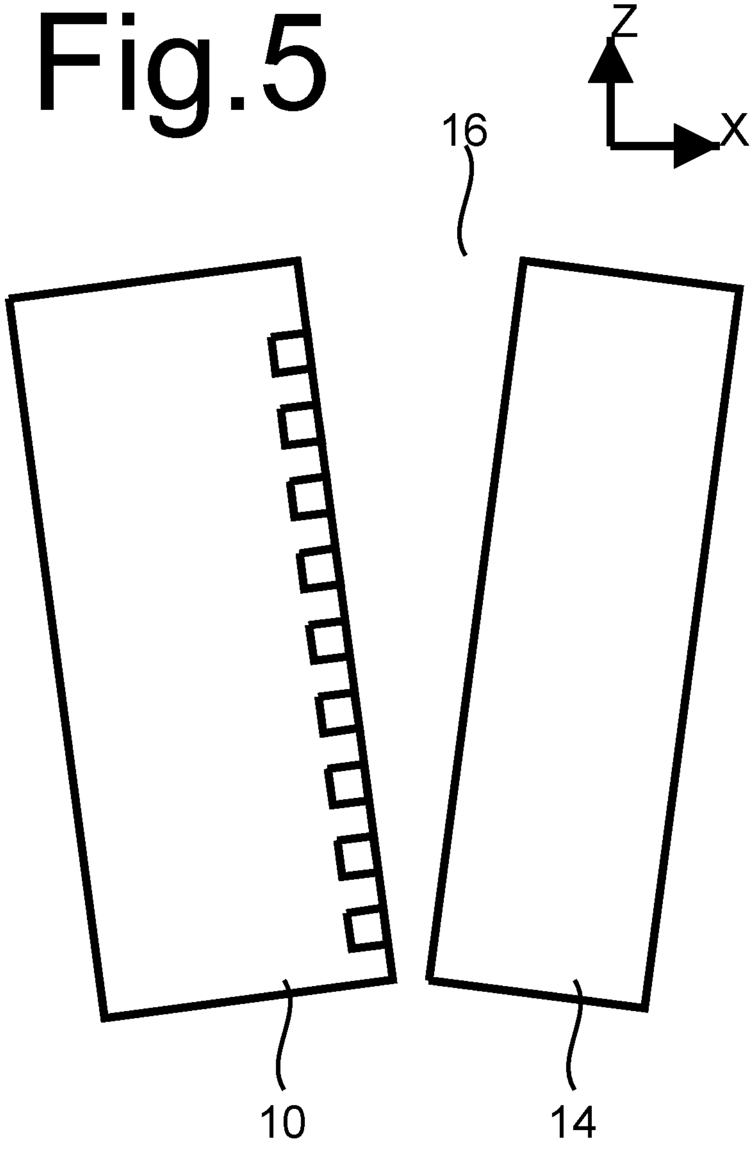
FIG. 5 shows an embodiment with surfaces at an oblique angle FIG. 6*a, b* show waveguide wall configurations.

FIG. 5 shows an embodiment wherein the surfaces of substrate 10 and wall 14 are not parallel, but are directed at a non-zero angle relative to each other. This may be used for example to adjust the signal amplitudes at sound detectors 12 at different distances from opening 16 relative to each other. For example, the distance between surfaces of substrate 10 and wall 14 may decrease with distance from opening 16, which may be used to compensate for attenuation of the excited wave with distance from opening 16. In another embodiment, the distance between surfaces of substrate 10 and wall 14 may increase with distance from opening 16.

Figure 6A:
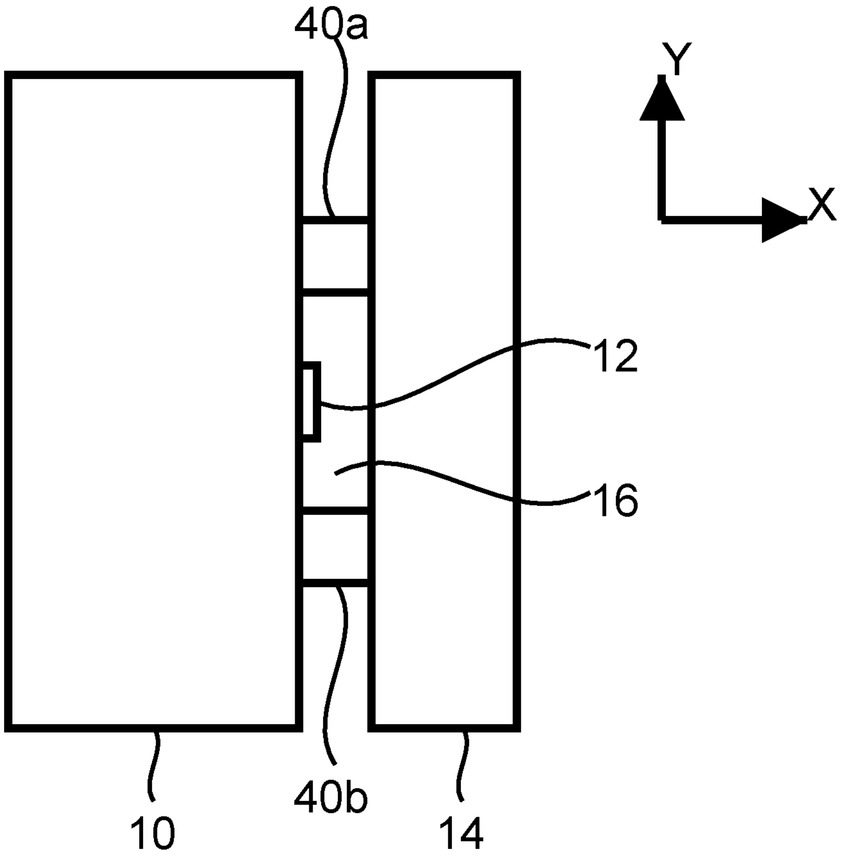

FIG. 6*a, b* show front views of embodiments of the device in the x-y plane through opening 16. FIG. 6*a* shows an embodiment wherein the space is closed off on opposite sides by further walls 40*a,b* extending in x-z planes at least along the length of the array of sound detectors 12, between the surface of substrate 10 and wall 14. This prevents excitation of waves in the space between the surface of substrate 10 and wall 14. Preferably, the distance is less than a wavelength, e.g. less than half a wavelength or less than three quarter of the shortest acoustic wavelength in the range of acoustic wavelengths for which the measurements are performed. This helps to avoid direction sensitivity. Further walls 40*a,b* may be an integral part of wall 14, or additional spacer structures. The latter makes it easier to include a further array of sound detectors in or on wall 14. One or more other arrays of further sound detectors may be present in or on the further walls 40*a,b* for detecting sound in the acoustic waveguides. In this embodiment, processing circuit 20 is configured to receive detected signals from all arrays of sound detectors and to form a sum of signals from sound detectors in these arrays.

In other embodiments only struts are used to keep substrate 10 and wall 14 spaced, where the struts do not close off the acoustic waveguide along the full length of the array. This reduces the decrease in acoustic signal strength along the array, and hence improves the signal to noise ratio. In another embodiment the space between the surface of substrate 10 and wall 14 is divided into a plurality of separate partitions, with at least one array of sound detectors 12 in each partition. Processing circuit 20 may be configured to form a sum of signals from sound detectors 12 in the arrays of all partitions.

Figure 6B:
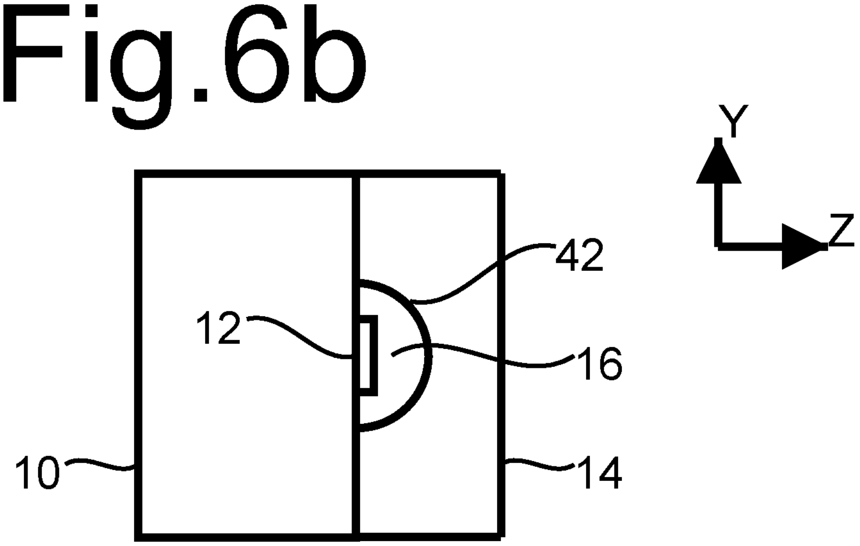

FIG. 6*b* shows an embodiment wherein a curved wall part 42 is used to define the acoustic waveguide, with at least array of sound detectors at at least one position on the wall. As shown, the wall part may have a semi-circular cross-section. But other cross-section shapes may be used, such as an almost fully circular cross-section with deviations from the circle at most where sound detectors 12 from the array(s) are present.

Figure 7:
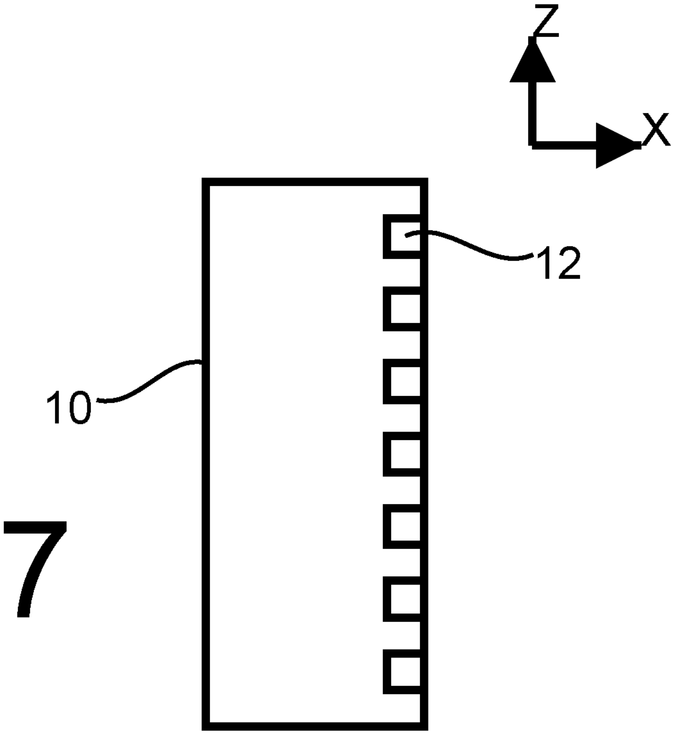
FIG. 7 shows an embodiment that uses acoustic surface wave

FIG. 7 shows an embodiment wherein use is made of an acoustic surface wave that propagates along substrate 10 as the sound propagation mode that is bound to the surface of substrate 10. In this embodiment no further guiding or shielding walls are needed. This has the consequence that sound detectors 12 will also detect other sound waves, which have travelled as unbound waves directly to sound detectors 12. By forming the sum using relative delays that correspond to the travel speed of the acoustic surface wave, the effect of such other sound on the sum will be small. In a further embodiment, processing circuit 20 may be configured to provide a further reduction of the effect of such other sound by using spatio-temporal filtering of the detected signal as a function of detector position and time can be used to suppress signal components from directions transverse to the substrate surface. However it is preferred to use some form additional wall, as this reduces the decrease in acoustic signal strength along the array.

Figure 8:
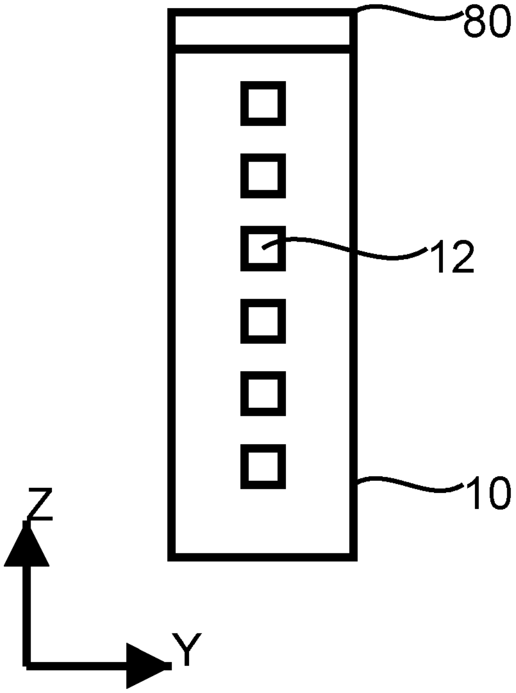
FIG. 8 shows an embodiment with an impedance matching layer

FIG. 8 shows an embodiment with an acoustic impedance matching layer 80 is provided on a side surface of substrate 10, ahead of array of sound detectors 12 as seen along the direction of propagation of the sound through substrate 10. Acoustic impedance matching layer 80 has an acoustic impedance between that of substrate 10 and its surrounding (e.g. water or another liquid). Such an acoustic impedance matching layer increases sound energy transfer into the sound propagation mode of substrate 10 in the part of substrate 10 before the positions of sound detectors 12, e.g. when a surface wave is used as the sound propagation mode that is bound to the surface of substrate 10.

In another example the solid material of substrate 10 has an outer shape that defines a waveguide for acoustic waves in the solid material, wherein the surface of substrate 10 forms a wall of the waveguide. A propagation mode of such an acoustic waveguide wherein sound propagates in parallel with the surface of substrate 10 may be used as the sound propagation mode that is bound to the surface of the substrate by the waveguide.

The acoustic impedance matching layer has the effect that direction sensitivity due to distributed direct reception of the external sound (as in a phased array), is reduced. Optimally, the acoustic impedance of acoustic impedance matching layer 80 is the geometric average of the acoustic impedances of substrate 10 and its surrounding (i.e. the square root of their product). A similar layer ahead of sound detectors 12 may be used in the embodiment of FIG. 7 to reduce such direction sensitivity.

Any type of sound detector 12 may be used. In a preferred embodiment detectors are used that use the sound to modulate properties of light, by means of a membrane on which a waveguide for the light is present.

Figure 9A:
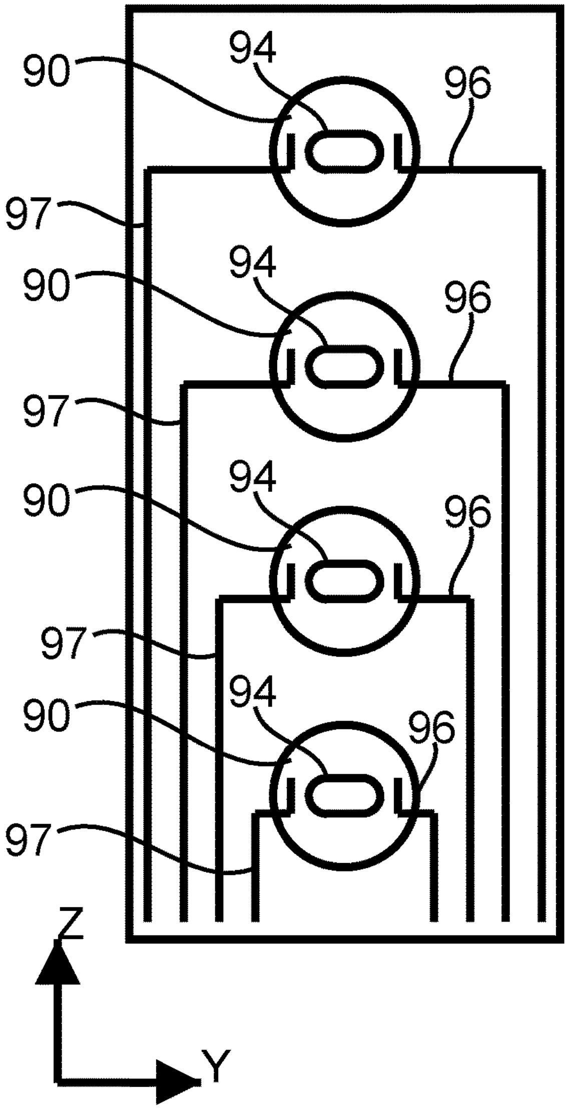
FIGS. 9*a, b* show an optical implementation of a sound detector

FIGS. 9*a, b* show an array of sound detectors implemented using membranes. Implementation of sound detectors of this type are known per se from S. M. Leinders et al, titled "A sensitive optical micro-machined ultrasound sensor (OMUS) based on a silicon photonic ring resonator in an acoustical membrane", published in Nature Scientific Reports, 14328, DOI: 10.1038/srep14328, 1-8, 2015. FIG. 9*a* shows a view in the y-z plane, comprising a substrate 10 with a column of openings 90, first optical waveguides 94 that form ring resonators on membranes over the openings, and second and third optical waveguides 96, 97 on substrate 10, optically coupled to first optical waveguides 94 by proximity of a part of second and third optical waveguide 96 to a part of first optical waveguide 94. The size of the membrane may define an acoustic frequency/wavelength range in which the most sensitive measurements can be performed. The order of magnitude (of the order of a few micrometers) of the cross-section size of the optical waveguides is related to the optical wavelength, whereas the order of magnitude of the size of openings 90 is related to the acoustic wavelength (e.g. order of magnitude of e.g. a few millimeters of a few tenths of a millimeter). The optical waveguides are not shown to scale.

Figure 9B:
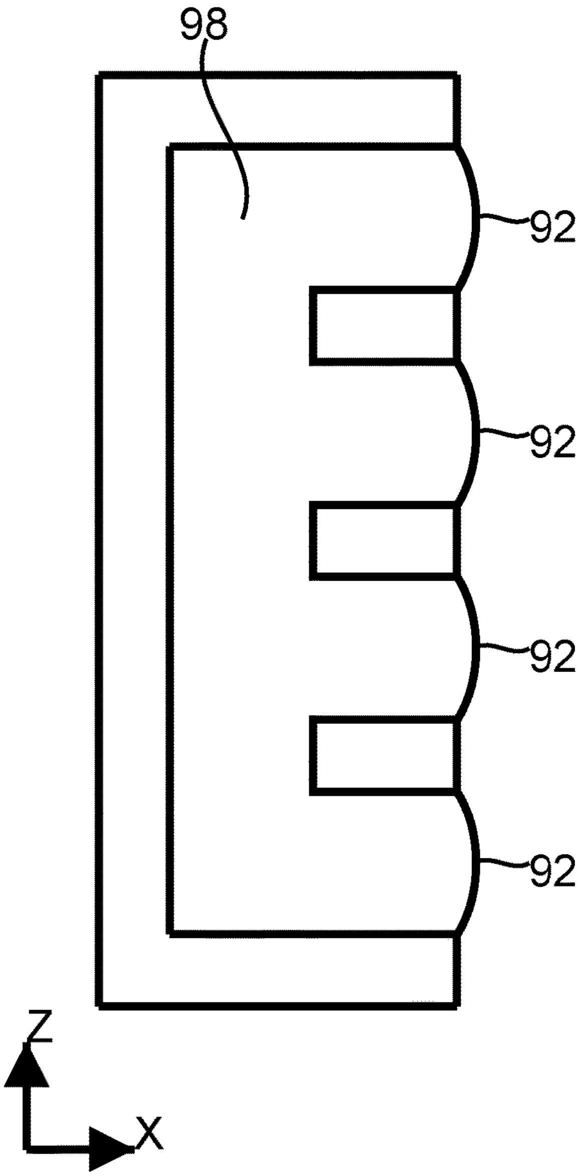

FIG. 9*b* shows a cross-section in the x-z plane, showing membranes 92 over openings 90. In the illustrated embodiment, openings 90 are in connection with an evacuated or fluid filled cavity 98, preferably of the same fluid as the medium between the surface of substrate 10 and wall 14. Instead of a single cavity 98 a plurality of cavities may be used for individual openings. Use of a cavity or cavities improved the detectability of the sound.

When such a detector is used, the embedding medium is preferably a fluid such as water or air, to allow for movement of the membrane.

The intensity of light transmitted from second optical waveguides 96 to third optical waveguides via the ring resonators as a function of the wavelength of the transmitted light shows a peak at a resonance wavelength of the ring resonator to which the second and third optical waveguide 96, 97 are coupled. The processing circuit (not shown) may be configured to supply light to second optical waveguides 96 at an optical wavelength or wavelengths on the flanks of such peaks and to detect the intensities of the light transmitted from second optical waveguides 96 to third optical waveguides 97 via the ring resonators. Alternatively, other techniques for measuring resonance peak shifts may be used.

In operation, sound propagating in the negative z-direction causes membranes 92 in the column of membranes 92 to vibrate. In turn, the vibrations cause a vibrating shift of the resonance dips of the ring resonators. The shift results in variation of the intensity that is detected by the processing circuit.

As shown, a plurality of second and third optical waveguides 96, 97 may be provided, each coupled through a ring resonator of a respective one of membranes 92. Alternatively, an ongoing second optical waveguide may be used coupled to the same ring resonator on a membrane. In this case, transmission dips occur at the output of the ongoing second optical waveguide as a function of optical wavelength, and shifts of these dips caused by the sound can be measured in a similar way as with peaks. In an embodiment the ring resonators may be resonant at different wavelengths and the processing circuit may use optical wavelength multiplexing to measure vibration of different membranes simultaneously using the same ongoing second optical fiber optical fibers coupled through the ring resonators.

Instead of ring resonators, interferometers may be used to detect vibrations of membranes 92. A first optical waveguide that runs over a membrane may be used as a first arm of such an interferometer and a second optical waveguide that does not run over a membrane may be used as a second arm. In this embodiment the processing circuit may be configured to measure the sound from changes in the interference intensity of as sum of light from both arms. Instead of a second optical waveguide that does not run over the membrane a second optical waveguide may be used that runs over a part of a membrane that is known to vibrate in counter phase with the part of the membrane on which the first arm is located.

The advantage of using such optical detection techniques compared to use of piezo-electric detectors is that more optical detectors can be realized on the same area, which provides for a larger signal to noise ratio improvement.

Figure 10:
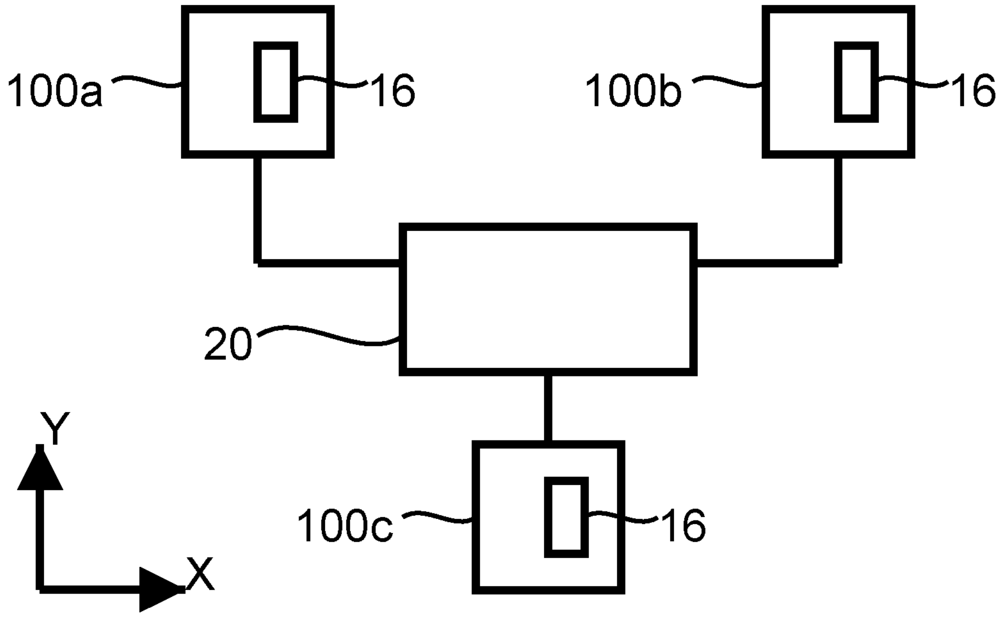
FIG. 10 shows a triangulation device

FIG. 10 shows an arrangement of a first, second and third device 100*a-c* according to any of the preceding embodiments for use in a triangulation measurement of the location of the source of the sound. In this case the processing circuit may be configured to perform a determination of time points at which the arrival of a pulse of sound are detected by means of the first, second and third device 100*a-c* and the time when the pulse was generated and to compute the location of the source based on these time point using triangulation. By using devices 100*a-c* that combine a high signal to noise ration with low direction sensitivity, locations over a broad location range can be detected.

The invention claimed is:

1. A sound detection device comprising:

a substrate an array of sound detectors in or on a surface of the substrate, each of the sound detectors of the array of sound detectors being configured to directly detect sound waves that travel along said surface in a sound propagation mode that is bound to said surface:

a processing circuit coupled to the sound detectors of the array of sound detectors, the processing circuit being configured to sum signals from the sound detectors of the array of sound detectors with relative time delays or phase shifts that compensate for propagation delay of sound along the array of sound detectors in the sound propagation mode in which incoming sound waves from outside the sound device are guided along and bound to said surface of the substrate, wherein a size of relative time delays or phase shifts is defined according to a propagation speed of the sound propagation mode that arises in the sound detection device.

2. The sound detection device according to claim 1, wherein said sound propagation mode is bound to the surface using an acoustic waveguide, wherein the surface of the substrate forms a first wall of the acoustic waveguide, the sound detection device comprising a second wall of the acoustic waveguide, facing the array of sound detectors, with a space between the surface of the substrate and the second wall the sound detection device comprising an opening that provides access of said incoming sound waves to said space, for excitation of the sound waves in the sound propagation mode in the acoustic waveguide by sound from outside the acoustic waveguide.

3. The sound detection device according to claim 2, wherein the acoustic waveguide has a closed cross section with virtual planes perpendicular to a propagation direction of the sound propagation mode in the acoustic waveguide along a length of the array.

4. The sound detection device according to claim 2, comprising a further substrate, a surface of the further substrate forming the second wall, and the sound detection device comprises a further array of further sound detectors in or on the surface of the further substrate in communication with said space; wherein the processing circuit is coupled to the further sound detectors of the further array of further sound detectors, the processing circuit being configured to sum signals from the sound detectors and the further sound detectors of the further array of further sound detectors, with further relative time delays or further phase shift that compensate for propagation delay to the further sound detectors.

5. The sound detection device according to claim 4, wherein the array of sound detectors and the further array of further sound detectors extend in parallel with each other.

6. The sound detection device according to claim 2, wherein the space between the array of sound detectors and the second wall decreases with distance from the opening.

7. The sound detection device according to claim 2, wherein the opening is located at a first end of the acoustic waveguide and a second end of the acoustic waveguide opposite the first end is closed off.

8. The sound detection device according to claim 1, wherein the sound propagation mode is a bulk propagation mode of the substrate or a surface propagation mode of the substrate, the sound detection device comprising an acoustic impedance matching layer on a part of the substrate, ahead of the array of sound detectors as seen along a propagation direction of the sound propagation mode, configured to increase sound energy transfer of said incoming sound into the bulk propagation mode of the substrate or the surface propagation mode of the substrate.

9. An acoustic triangulation system comprising at least three sound detection devices according to claim 1, wherein said at least three sound detection devices have respective surfaces that are normal to the surface of the substrate and oriented in different directions relative to each other.

10. A sound detection method, that uses an array of sound detectors, the method comprising: summing signals from the sound detectors of the array of sound detectors with relative time delays or phase shifts that compensate for propagation delay of sound along the array of sound detectors in a sound propagation mode that is bound to said surface and in which incoming sound waves from outside the array of sound detectors are guided along and bound to said surface of the substrate, wherein a size of relative time delays or phase shifts is defined according to a propagation speed of the sound propagation mode that arises in the sound detection device.

11. The method according to claim 10, wherein said sound propagation mode is bound to the surface using an acoustic waveguide, the surface of the substrate forming a first wall of an inner space of the acoustic waveguide, a further surface facing the array of sound detectors forming a second wall of the inner space, the method comprising receiving said sound incoming waves from outside the acoustic waveguide, the incoming sound exciting the sound propagation mode.

12. The method according to claim 11, wherein the sound propagation mode is a surface propagation mode of the substrate or a bulk propagation mode of the substrate that propagates in parallel with the surface, the method comprising coupling said incoming sound waves from a surrounding of the substrate to a part of the substrate, ahead of the array of sound detectors as seen along a propagation direction of the sound propagation mode, via an acoustic impedance matching layer on said part of the substrate, thereby increasing sound energy transfer from the incoming sound waves into the sound propagation mode.

* * * * *